(12) United States Patent
Anzai

(10) Patent No.: US 12,473,227 B2
(45) Date of Patent: Nov. 18, 2025

(54) MULTICOMPONENT OXIDE GLASS, OPTICAL ELEMENT, OPTICAL FIBER, AND METHOD OF PRODUCING MULTICOMPONENT OXIDE GLASS

(71) Applicant: Sumita Optical Glass, Inc., Saitama (JP)

(72) Inventor: Dai Anzai, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 858 days.

(21) Appl. No.: 17/755,924

(22) PCT Filed: Oct. 23, 2020

(86) PCT No.: PCT/JP2020/039982
§ 371 (c)(1),
(2) Date: May 11, 2022

(87) PCT Pub. No.: WO2021/106457
PCT Pub. Date: Jun. 3, 2021

(65) Prior Publication Data
US 2022/0396521 A1    Dec. 15, 2022

(30) Foreign Application Priority Data
Nov. 27, 2019  (JP) .................. 2019-214549

(51) Int. Cl.
*C03C 13/04* (2006.01)
*C03B 5/235* (2006.01)
(Continued)

(52) U.S. Cl.
CPC .......... *C03C 13/046* (2013.01); *C03B 5/235* (2013.01); *C03C 3/091* (2013.01); *C03C 3/093* (2013.01); *G02B 1/00* (2013.01); *C03C 2213/00* (2013.01)

(58) Field of Classification Search
None
See application file for complete search history.

(56) References Cited

U.S. PATENT DOCUMENTS 4,891,336 A * 1/1990 Prassas .................. C03C 3/064
501/13
2004/0229743 A1* 11/2004 Wolff ...................... C03C 3/093
501/67

FOREIGN PATENT DOCUMENTS

CN    102947234 A    2/2013
JP    H01167258 A    6/1989
(Continued)

OTHER PUBLICATIONS

Machine Translation of WO-2011158774-A1 (Year: 2011).*
(Continued)

*Primary Examiner* — Amber R Orlando
*Assistant Examiner* — Paul Alan Forsyth
(74) *Attorney, Agent, or Firm* — KENJA IP LAW PC

(57) ABSTRACT

The multicomponent oxide glass has a composition including: 45-53 mol % $SiO_2$; 22-30 mol % $B_2O_3$; 5-9 mol % $Al_2O_3$; 0.02-0.10 mol % $Sb_2O_3$; 0-18 mol % $Li_2O$; 0-18 mol % $Na_2O$; 0-18 mol % $K_2O$; 0-13 mol % MgO; 0-13 mol % CaO; 0-13 mol % BaO; and 0-13 mol % ZnO. When the total content of $Li_2O$, $Na_2O$, and $K_2O$ is X mol % and the total content of MgO, CaO, BaO, and ZnO is Y mol %, $11 \le X \le 18$ and $14 \le X+Y \le 24$ hold, and the value of βOH calculated from βOH=α/t, where α represents a height of an absorption peak due to OH groups, observed in a range of 3400 $cm^{-1}$ to 3800 $cm^{-1}$ of an infrared absorption spectrum in no unit and t represents a thickness of the glass in cm, is 4 $cm^{-1}$ or more.

4 Claims, 1 Drawing Sheet

(51) Int. Cl.
      *C03C 3/091*    (2006.01)
      *C03C 3/093*    (2006.01)
      *G02B 1/00*     (2006.01)

(56) References Cited

FOREIGN PATENT DOCUMENTS

| | | |
|---|---|---|
| JP | 2002114536 A | 4/2002 |
| JP | 2014031285 A | 2/2014 |
| JP | 2014224026 A | 12/2014 |
| WO | WO-2011158774 A1 * 12/2011 | ............. C03C 3/091 |

OTHER PUBLICATIONS

May 17, 2022, International Preliminary Report on Patentability issued in the International Patent Application No. PCT/JP2020/039982.

Dec. 28, 2020, International Search Report issued in the International Patent Application No. PCT/JP2020/039982.

Dec. 11, 2023, Office Action issued by the China National Intellectual Property Administration in the corresponding Chinese Patent Application No. 202080070559.5.

* cited by examiner

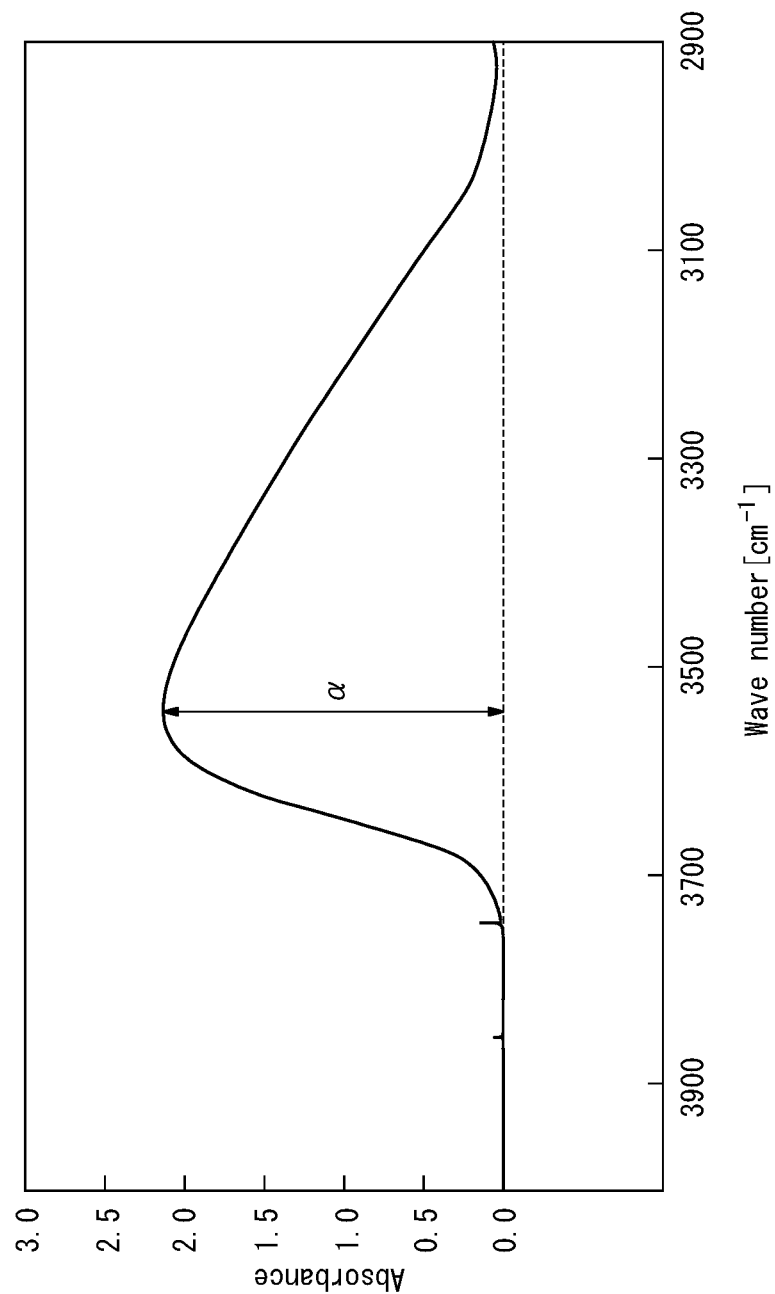

MULTICOMPONENT OXIDE GLASS, OPTICAL ELEMENT, OPTICAL FIBER, AND METHOD OF PRODUCING MULTICOMPONENT OXIDE GLASS

TECHNICAL FIELD

The present disclosure relates to multicomponent oxide glass, an optical element, an optical fiber, and a method of producing multicomponent oxide glass.

BACKGROUND

In recent years, ultraviolet light is increasingly widely used in the industry. Of near ultraviolet light, especially for the use of UVA (wavelength: approximately 315 nm to 400 nm), high-output LEDs have been developed, allowing for more flexible light source designing, so the market is expected to increasingly expand in the future.

In designing an optical component using ultraviolet light in the wavelength range as described above, a glass material is primarily used. This is because other materials such as resin are prone to degradation by ultraviolet light. However, it is known that the transmittance of even glass is reduced when the glass is exposed to intense ultraviolet light for a long period of time. This phenomenon is called solarization.

Many reports have been made with respect to the principles of solarization of glass so far, and solarization is considered to be principally due to change of the valence of transition metal ions contained in glass, lattice defects in glass, etc. Accordingly, in order to avoid solarization as much as possible, glass in which fewer transition metal ions are contained and fewer lattice defects are formed is considered to be preferable, and in actuality, synthetic quartz glass produced by a gas-phase process in particular is used as such glass. However, since quartz glass has a high melting point and has poor hot workability, it is difficult to produce optical components having complicated shapes using quartz glass. Further, as compared with glass produced by a melting process, the material cost of synthetic quartz glass produced by a gas-phase process is high and such a glass requires special setups, usually resulting in high production cost.

On the other hand, as a glass that undergoes less solarization due to ultraviolet light other than quartz glass, for example, multicomponent glass containing fluorine ions as disclosed in JP 2002-114536 A (PTL 1) can be given. However, in the production of a glass containing fluorine ions, toxic fluorine gas is released in large quantity in the process of melting, which requires special setups. In addition, when the glass is subjected to hot working, to avoid devitrification of the glass surface, an inert environment from which oxygen has been removed is required.

Further, focusing on that most of water incorporated into a glass is present as OH groups, JP 2014-224026 A (PTL 2) also describes that solarization due to ultraviolet light can be reduced by increasing the concentration of water contained in the glass, namely by increasing the OH groups. PTL 2 particularly describes that solarization is reduced when mixing in of platinum ions from, for example, a platinum crucible, and coloring of the glass containing OH groups in large quantity may be reduced by reheating.

Note that the effect of OH groups contained in glass is also described in, for example, JP H01-167258 A (PTL 3). Further, PTL 3 suggests that OH groups in quartz glass of which network structure is cut by being irradiated with intense ultraviolet laser light would have an influence on the recovery of the network structure.

CITATION LIST

Patent Literature

PTL 1: JP 2002-114536 A
PTL 2: JP 2014-224026 A
PTL 3: JP H01-167258 A

SUMMARY

Technical Problem

However, the production of glass containing OH groups in large quantity, disclosed in PTL 2 needs special work such as for example introducing steam during melting. Accordingly, the temperature in the furnace is hardly stabilized and the pressure of the steam is required to be precisely controlled, which makes it difficult to produce homogeneous glass.

Given this situation, glass containing OH groups in large quantity is required to be more stably produced by a melting process without the need for special work such as introducing steam. However, such production has had the following problems.

First, in current production of optical glass, electric furnaces including a heating element such as silicon carbide or molybdenum disilicide are used; however, when glass is melted in such an electric furnace, less steam is contained in the atmosphere inside the furnace as compared with the case of melting glass using for example a furnace in which heating is performed by combusting oxyhydrogen gas. Thus, since water is hardly incorporated from the atmosphere inside the furnace, water needs to be supplied from raw materials and retained in the glass melt.

However, in that case, since melting of glass is usually performed at high temperatures exceeding 1000° C., water becomes steam and is released in large quantity from the glass melt along with gases generated by reaction and decomposition of the feedstocks.

Further, in order to obtain a homogeneous glass block without bubbles, a step of maintaining high temperatures for several hours, that is, a clarifying step is necessarily performed, and in such a step, water turns into steam bubbles to successively surface from the glass melt and is to be lost.

In terms of advantageously solving the above problems, it could be helpful to provide a glass having excellent solarization resistance, which can be stably produced without the need for special work. It could also be helpful to provide an optical element and an optical fiber using the glass described above. Further, it could be helpful to provide a method of producing glass, which makes it possible to stably produce a glass having excellent solarization resistance without the need for special work.

Solution to Problem

To address the above problems, the present inventor diligently made studies focusing on water (OH groups) in glass. As a result, it was found that many OH groups can be incorporated into glass by adjusting the composition of aluminoborosilicate glass to a certain range, without the need for special work such as introducing steam. Further, the present inventor found that when βOH as an indication of the OH group concentration is equal to or more than a predetermined value, the ultraviolet resistance is high (solarization is reduced).

Moreover, the present inventor found that in the production of the glass described above, removing a certain compound from the raw materials for glass and setting the heating temperature in melting the raw materials for glass to a predetermined temperature or lower can reduce the amount of water lost from the glass melt in the melting process.

Specifically, a glass of the present disclosure is a multicomponent oxide glass having a composition including:
45 mol % to 53 mol % $SiO_2$;
22 mol % to 30 mol % $B_2O_3$;
5 mol % to 9 mol % $Al_2O_3$;
0.02 mol % to 0.10 mol % $Sb_2O_3$;
0 mol % to 18 mol % $Li_2O$;
0 mol % to 18 mol % $Na_2O$;
0 mol % to 18 mol % $K_2O$;
0 mol % to 13 mol % MgO;
0 mol % to 13 mol % CaO;
0 mol % to 13 mol % BaO; and
0 mol % to 13 mol % ZnO.

When the total content of $Li_2O$, $Na_2O$, and $K_2O$ is X (mol %) and the total content of MgO, CaO, BaO, and ZnO is Y (mol %), formulae (1) and (2):

$$11 \leq X \leq 18 \quad (1)$$

and $$14 \leq X+Y \leq 24 \quad (2)$$

hold, and
the value of βOH calculated from formula (3):

$$\beta OH = \alpha/t \quad (3),$$

where α represents the height of the absorption peak (−) due to OH groups, observed in a range of 3400 $cm^{-1}$ to 3800 $cm^{-1}$ of the infrared absorption spectrum and t represents the thickness (cm) of the glass,
is 4 $cm^{-1}$ or more. Such multicomponent oxide glass can be stably produced without the need for special work and is excellent in solarization resistance.

Further, an optical element of the present disclosure uses the multicomponent oxide glass described above.

Moreover, an optical fiber of the present disclosure uses the multicomponent oxide glass described above.

Further, a method of producing multicomponent oxide glass, according to the present disclosure is a method of producing the multicomponent oxide glass described above and includes a step of melting the raw materials for glass.

The raw materials for glass do not use nitrates and sulfates, and
a heating temperature in melting the raw materials for glass is 1350° C. or less. Such a method of producing glass makes it possible to stably produce a glass having excellent solarization resistance without the need for special work.

Advantageous Effect

The present disclosure can provide a glass having excellent solarization resistance that can be stably produced without the need for special work. The present disclosure can also provide an optical element and an optical fiber using the glass described above. Further, the present disclosure can provide a method of producing glass, which makes it possible to stably produce a glass having excellent solarization resistance without the need for special work.

BRIEF DESCRIPTION OF THE DRAWINGS

In the accompanying drawing:
FIG. 1 is a diagram illustrating the infrared absorption spectrum data around a wave number of 3500 $cm^{-1}$ of a glass of one example.

DETAILED DESCRIPTION (Multicomponent Oxide Glass)
A multicomponent oxide glass of one embodiment of the present disclosure (hereinafter, may also referred to as "the glass of this embodiment" has a composition including:
45 mol % to 53 mol % $SiO_2$;
22 mol % to 30 mol % $B_2O_3$;
5 mol % to 9 mol % $Al_2O_3$;
0.02 mol % to 0.10 mol % $Sb_2O_3$;
0 mol % to 18 mol % $Li_2O$;
0 mol % to 18 mol % $Na_2O$;
0 mol % to 18 mol % $K_2O$;
0 mol % to 13 mol % MgO;
0 mol % to 13 mol % CaO;
0 mol % to 13 mol % BaO; and
0 mol % to 13 mol % ZnO.

When the total content of $Li_2O$, $Na_2O$, and $K_2O$ is X (mol %) and the total content of MgO, CaO, BaO, and ZnO is Y (mol %), formulae (1) and (2):

$$11 \leq X \leq 18 \quad (1)$$

and $$14 \leq X+Y \leq 24 \quad (2)$$

hold, and
the value of βOH calculated from formula (3):

$$\beta OH = \alpha/t \quad (3),$$

where α represents the height of the absorption peak (−) due to OH groups, observed in a range of 3400 $cm^{-1}$ to 3800 $cm^{-1}$ of the infrared absorption spectrum and t represents the thickness (cm) of the glass,
is 4 $cm^{-1}$ or more.

For the glass of this embodiment, the value of βOH is 4 $cm^{-1}$ or more; namely, this glass contains a sufficient quantity of OH groups, and thus has high resistance to ultraviolet light including UVA. Note that water (OH groups) in the glass may be derived from, for example, moisture in the air or moisture in the raw materials for glass.

The glass of this embodiment can be produced by, for example, a method of producing multicomponent oxide glass, to be described.

First, the reason for limiting the content of each component of the glass of this embodiment to the aforementioned ranges will be described. Although the content of each component is in mol %, the content is described in simply "%" unless otherwise specified.

<$SiO_2$>

In the glass of this embodiment, $SiO_2$ is a main component of the glass, and is an oxide forming a skeletal structure of a glass network. Note however that when the content of $SiO_2$ is less than 45%, phase separation easily occurs in the glass. On the other hand, when the content of $SiO_2$ exceeds 53%, an unmelted residue is likely to be formed, and the melting temperature (hereinafter referring to the temperature at which the raw materials for glass are completely melted) is significantly high, resulting in the reduced OH groups in the glass. Thus, for the glass of this embodiment, the content of $SiO_2$ is set to 45% to 53%. In similar terms, the content of $SiO_2$ in the glass of this embodiment is preferably 46% or more and more preferably 47% or more, and is preferably 52% or less and more preferably 51% or less.

<$B_2O_3$>

In the glass of this embodiment, $B_2O_3$ is an oxide forming a skeletal structure of a glass network as with $SiO_2$ and is a component that lowers the melting temperature. However, when the content of $B_2O_3$ is less than 22%, the melting temperature is excessively high and an unmelted residue is likely to be formed. On the other hand, when the content of $B_2O_3$ exceeds 30%, many bubbles form in the glass. Accordingly, when sufficient clarification is performed to remove the bubbles, water will be lost. Thus, for the glass of this embodiment, the content of $B_2O_3$ is set to 22% to 30%. In similar terms, the content of $B_2O_3$ in the glass of this embodiment is preferably 23% or more and more preferably 23.5% or more, and is preferably 29% or less and more preferably 28% or less.

<$Al_2O_3$>

$Al_2O_3$ was found to be a component in the glass of this embodiment that contributes to the effect of incorporating a large quantity of OH groups into the glass. Note however that when the content of $Al_2O_3$ is less than 5%, a sufficient quantity of OH groups cannot be incorporated into the glass. On the other hand, when the content of $Al_2O_3$ exceeds 9%, an unmelted residue is likely to be formed, and the melting temperature is significantly high, resulting in the reduced OH groups in the glass. Thus, for the glass of this embodiment, the content of $Al_2O_3$ is set to 5% to 9%. In similar terms, the content of $Al_2O_3$ in the glass of this embodiment is preferably 5.5% or more and more preferably 6% or more, and is preferably 8% or less and more preferably 7% or less.

<$Sb_2O_3$>

In the glass of this embodiment, $Sb_2O_3$ is a component that imparts degassing effects to the glass. Since bubbles are likely to form in glass incorporating OH groups in large quantity, adding $Sb_2O_3$ to the glass of this embodiment is advantageous. Note however that when the content of $Sb_2O_3$ is less than 0.02%, the degassing effect cannot be sufficiently obtained. On the other hand, since $Sb_2O_3$ also serves as a reductant, it is likely to cause coloring for example by reducing transition metal ions mixed in as impurities, and if coloring occurs, solarization is likely to occur. Particularly when the content of $Sb_2O_3$ exceeds 0.10%, ultraviolet resistance is impaired, thus solarization is likely to occur. Thus, for the glass of this embodiment, the content of $Sb_2O_3$ is set to 0.02% to 0.10%. In similar terms, the content of $Sb_2O_3$ in the glass of this embodiment is preferably 0.03% or more and more preferably 0.04% or more, and is preferably 0.095% or less and more preferably 0.09% or less.

<$Li_2O$>

In the glass of this embodiment, $Li_2O$ is a modifier oxide and is a component that lowers the melting temperature in the glass production. Note however that when the content of $Li_2O$ exceeds 18%, OH groups would hardly be incorporated into the glass. Accordingly, for the glass of this embodiment, the content of $Li_2O$ is set to 18% or less. In similar terms, the content of $Li_2O$ in the glass of this embodiment is preferably 12% or less, more preferably 9% or less.

<$Na_2O$>

In the glass of this embodiment, $Na_2O$ is a modifier oxide and is a component that lowers the melting temperature in the glass production as with $Li_2O$. Note however that when the content of $Na_2O$ exceeds 18%, OH groups would hardly be incorporated into the glass. Accordingly, for the glass of this embodiment, the content of $Na_2O$ is set to 18% or less. In similar terms, the content of $Na_2O$ in the glass of this embodiment is preferably 12% or less, more preferably 11% or less.

<$K_2O$>

In the glass of this embodiment, $K_2O$ is a modifier oxide and is a component that lowers the melting temperature in the glass production as with $Li_2O$ and $Na_2O$. Note however that when the content of $K_2O$ exceeds 18%, OH groups would hardly be incorporated into the glass. Accordingly, for the glass of this embodiment, the content of $K_2O$ is set to 18% or less. In similar terms, the content of $K_2O$ in the glass of this embodiment is preferably 10% or less, more preferably 5% or less.

<$Li_2O+Na_2O+K_2O$>

In the glass of this embodiment, when the total content of $Li_2O$, $Na_2O$, and $K_2O$ is less than 11%, an unmelted residue is likely to be formed, and the melting temperature is high, resulting in the reduced OH groups in the glass. On the other hand, in the glass of this embodiment, a large quantity of $Li_2O$, $Na_2O$, and $K_2O$ was found to possibly hinder OH groups from being incorporated into the glass; particularly when the total content of $Li_2O$, $Na_2O$, and $K_2O$ exceeds 18%, a sufficient quantity of OH groups cannot be incorporated into the glass. Accordingly, in the glass of this embodiment, when the total content of $Li_2O$, $Na_2O$, and $K_2O$ is X (mol %), formula (1):

$$11 \leq X \leq 18 \tag{1}$$

should hold. In similar terms, X above is preferably 11.2% or more and more preferably 11.5% or more, and is preferably 17% or less and more preferably 16% or less.

Note that in terms of causing the mixed-alkali effect to facilitate the formation of glass, the glass of this embodiment preferably contains two or more selected from $Li_2O$, $Na_2O$, and $K_2O$.

<MgO>

In the glass of this embodiment, MgO is a component that lowers the melting temperature in the glass production. Note however that when the content of MgO exceeds 13%, OH groups would hardly be incorporated into the glass. Accordingly, for the glass of this embodiment, the content of MgO is set to 13% or less. In similar terms, the content of MgO in the glass of this embodiment is preferably 9% or less, more preferably 7% or less.

<CaO>

In the glass of this embodiment, CaO is a component that lowers the melting temperature in the glass production. Note however that when the content of CaO exceeds 13%, OH groups would hardly be incorporated into the glass. Accordingly, for the glass of this embodiment, the content of CaO is set to 13% or less. In similar terms, the content of CaO in the glass of this embodiment is preferably 9% or less, more preferably 7% or less.

<BaO>

In the glass of this embodiment, BaO is a component that lowers the melting temperature in the glass production. Note however that when the content of BaO exceeds 13%, OH groups would hardly be incorporated into the glass. Accordingly, for the glass of this embodiment, the content of BaO is set to 13% or less. In similar terms, the content of BaO in the glass of this embodiment is preferably 9% or less, more preferably 7% or less.

<ZnO>

In the glass of this embodiment, ZnO is a component that lowers the melting temperature in the glass production. Note however that when the content of ZnO exceeds 13%, OH groups would hardly be incorporated into the glass. Accordingly, for the glass of this embodiment, the content of ZnO is set to 13% or less. In similar terms, the content of ZnO in the glass of this embodiment is preferably 9% or less, more preferably 7% or less.

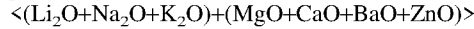

In the glass of this embodiment, MgO, CaO, BaO, and ZnO are components that lower the melting temperature in the glass production. However, the effect obtained is smaller than the effect of $Li_2O$, $Na_2O$, and $K_2O$. On the other hand, the effect of MgO, CaO, BaO, and ZnO to hinder OH groups from being incorporated into the glass was found to be small as compared with that of $Li_2O$, $Na_2O$, and $K_2O$. Accordingly, in this embodiment, components selected from MgO, CaO, BaO, and ZnO are used in combination with components selected from $Li_2O$, $Na_2O$, and $K_2O$, thereby balancing the melting temperature and the OH group content.

When the total content of $Na_2O$, $K_2O$, and $Li_2O$ and MgO, CaO, BaO, and ZnO is less than 14%, an unmelted residue is likely to be formed, and the melting temperature is high, resulting in the reduced OH groups in the glass. Further, when the above total content exceeds 24%, a sufficient quantity of OH groups cannot be incorporated into the glass. Thus, in the glass of this embodiment, when the total content of $Li_2O$, $Na_2O$, and $K_2O$ is X (mol %) and the total content of MgO, CaO, BaO, and ZnO is Y (mol %), formula (2):

$$14 \leq X+Y \leq 24 \quad (2)$$

should hold. In similar terms, X+Y above is preferably 15% or more and more preferably 16% or more, and is preferably 23% or less and more preferably 22% or less.

<Other Components>

The glass of this embodiment may contain components other than the above components, for example, $Cs_2O$, SrO, $ZrO_2$, $P_2O_5$, $Ta_2O_5$, $Ga_2O_3$, $In_2O_3$, $Y_2O_3$, $La_2O_3$, $Gd_2O_3$, etc. as appropriate without departing from the objectives. Note however that in terms of more reliably obtaining the desired effect, the content of the above components in the glass of this embodiment is preferably 10% or less, more preferably 5% or less, still more preferably 3% or less, and yet more preferably substantially 0%.

On the other hand, in terms of more reliably obtaining the desired effect, the glass of this embodiment preferably does not substantially contain $TiO_2$, $Nb_2O_5$, $WO_3$, $Bi_2O_3$, $Cr_2O_3$, MnO, $Mn_2O_3$, $Fe_2O_3$, CoO, NiO, $Cu_2O$, $Ag_2O$, $Au_2O$, and $PtO_2$.

In this specification, "does not substantially contain" means to include cases where the components concerned are inevitably contained as impurities, specifically, where the relevant components are contained in a ratio of 0.2 mass % or less.

Further, fluorine components would produce toxic gas in the glass production. Accordingly, it is preferred that the glass of this embodiment does not substantially contain fluorine components.

In terms of more reliably obtaining the desired effect, the glass of this embodiment preferably has a composition consisting only of the essential components described above and optional components (a composition that may contain only $SiO_2$, $B_2O_3$, $Al_2O_3$, and $Sb_2O_3$ as the essential oxides and oxides selected from $Li_2O$, $Na_2O$, $K_2O$, MgO, CaO, BaO, and ZnO).

In this specification, "consist only of the above components" include cases where impurity components other than the components concerned are inevitably contained, specifically cases where the ratio of the impurity components is 0.2 mass % or less.

<βOH>

For the glass of this embodiment, the value of βOH calculated from formula (3): $βOH = α/t$, where α represents the height of the absorption peak (−) due to OH groups, observed around a wave number of 3500 cm$^{-1}$ (3400 cm$^{-1}$ to 3800 cm$^{-1}$) of the infrared absorption spectrum and t represents the thickness (cm) of the glass, is 4 cm$^{-1}$ or more. For reference, FIG. 1 illustrates the height (α) of the absorption peak, due to OH groups, in the infrared absorption spectrum of a glass of an example (a glass of Example 9 to be described), and for the glass in the diagram, α=2.17. The present inventor diligently made studies, and for 3 mm thick glass samples having various compositions, focused on the relationship between the height of the absorption peak due to OH groups around a wave number of 3500 cm$^{-1}$ in the infrared absorption spectrum and the ultraviolet resistance determined by a solarization test conforming to JOGIS J04-2005 "Measuring Method for Solarization of Optical Glass". As a result, when βOH calculated using the height of the above absorption peak was 4 cm$^{-1}$ or more, the glass was found to have resistance to ultraviolet light including UVA. In similar terms, βOH of the glass of this embodiment is preferably 4.5 cm$^{-1}$ or more, more preferably 5 cm$^{-1}$ or more. On the other hand, in terms of hindering volatilization in melting and in terms of maintaining chemical resistance such as weather resistance of the glass, βOH of the glass of this embodiment is preferably 15 cm$^{-1}$ or less.

Note that when the above infrared absorption spectrum include peaks due to other components, peak separation is performed to correct the baseline, thereby determining α.

Further, βOH of the glass can be adjusted, for example, by appropriately selecting the kinds or the proportions of the raw materials for glass, adjusting the heating temperature in melting the raw materials for glass, or the like.

For reference, as a method of quantifying the quantity of the OH groups in the glass, a method of calculating it from formula (A) below using the molar absorption coefficient (ε) of the OH groups can be given.

$$C_{OH} = \frac{\left(\log_{10}\left(\frac{I_0}{I}\right)\right)}{\varepsilon t}, \quad (A)$$

where $C_{OH}$ represents the molar concentration (mol/L) of the OH groups, I represents the transmitted light intensity, $I_0$ represents the incident light intensity, t represents the thickness (cm) of the glass, and ε represents the molar absorption coefficient (L/mol·cm) of the OH groups. In formula (A), $\log_{10}(I_0/I)$ may use the height of the absorption peak due to OH groups in the infrared absorption spectrum (observed around a wave number of 3500 cm$^{-1}$). Further, the molar absorption coefficient (ε) of the OH groups varies depending on the papers (for example, J. E. Shelby, J. Am. Ceram. Soc., 65, C59 (1982); G. Stephenson and K. H. Jack, Tran. Br. Ceram. Soc., 59, 397 (1960); and others), and also varies depending on the composition of the glass. This being the case, with reference to a report in T. Suzuki, et al, BUNSEKI KAGAKU Vol. 63, No. 10, 831-836(2014), ε=55 L/mol·cm is determined to be consistent and appropriate for the glass of this embodiment and is adopted to determine $C_{OH}$. Further, using the $C_{OH}$ determined and the density of the glass measured in accordance with JOGIS J05-1975 "Measuring Method for Specific Gravity of Optical Glass", the quantity of the OH groups in the glass of this embodiment is calculated to be approximately 500 ppm by mass or more.

For the glass of this embodiment, "the degree of solarization" (change in the transmittance from before to after exposure to light with a wavelength corresponding to a transmittance of 80%) evaluated in accordance with JOGIS J04-2005 "Measuring Method for Solarization of Optical Glass" is preferably a reduction of 1% or less, more preferably a reduction of 0.8% or less, and still more preferably a reduction of 0.6% or less.

Note that the above degree of solarization can be specifically evaluated by methods to be described in Examples.

The glass of this embodiment can be used to produce, for example, optical elements such as lenses, lens arrays, and optical waveguides; optical fibers; etc. that are required to have high ultraviolet resistance.

(Method of Producing Multicomponent Oxide Glass)

A method of producing multicomponent oxide glass, according to one embodiment of the present disclosure (hereinafter may be referred to as "the production method of this embodiment") is a method for producing the multicomponent oxide glass described above. The production method of this embodiment includes a step of melting the raw materials for glass, and in this step, (1) nitrates and sulfates are not used as the raw materials for glass and (2) the heating temperature in melting the raw materials is 1350° C. or less. The production method of this embodiment can stably produce the multicomponent oxide glass without the need for special work such as introducing steam.

With respect to (1) above, nitrates (for example, barium nitrate, sodium nitrate, potassium nitrate, etc.) and sulfates (for example, sodium sulfate, potassium sulfate, etc.) usually have a tendency of promoting the clarifying action as compared with the other raw materials. Further, nitrates in particular are usually highly reactive as compared with the other raw materials, are small in volume per unit mass of inorganic components, and thus can easily be successively charged. Accordingly, nitrates and sulfates are commonly used as raw materials for glass production. However, when nitrates or sulfates are used in producing the above glass of this embodiment, it was found that sufficient water would not be incorporated into the glass. This is a surprising finding that cannot be expected by those skilled in the art also because for example nitrates usually have a tendency of readily incorporating water. Therefore, in the production method of this embodiment, nitrates and sulfates are not used as raw materials for glass, and oxides, hydroxides, carbonates corresponding to the components are used instead.

With respect to (2) above, it was found that when the heating temperature in melting the raw materials for glass is set to higher than 1350° C., an excessive amount of water (steam) is released from the glass melt, and a desired amount of water (OH groups) would not be retained in the glass. This being the case, in the production method of this embodiment, the heating temperature in melting the raw materials for glass is set to 1350° C. or less.

In the production method of this embodiment, in terms of ensuring desired quality, the raw materials for glass are preferably completely melted by heating at 1350° C. or less. In other words, in the production method of this embodiment, the melting temperature for the raw materials for glass is preferably 1350° C. or less. When melting is performed at heating temperatures of 1350° C. or less, the raw materials for glass would be left unmelted or bubbles would be formed, in which case, in order to ensure sufficient quality, it is important to avoid such problems by for example appropriately changing the kinds or the proportions of the raw materials for glass.

In the production method of this embodiment, for example, as the raw material for each component (raw material for glass) that may be contained in the glass of this embodiment, compounds other than nitrates and sulfates (oxides, hydroxides, carbonates, etc.) that have a predetermined ratio of weight are prepared, and the compounds are fully mixed to obtain a preparation raw material. Next, the preparation raw material is charged into a melting container (for example, a crucible made of precious metal) that is not reactive with the raw material concerned, and the material is heated to 1000° C. to 1350° C. in an electric furnace to be melted while being stirred at the appropriated times. Subsequently, after performing clarification and homogenization in the electric furnace, the melt is cast into a metal mold preheated to an appropriate temperature, and was then allowed to cool slowly in the electric furnace, thereby eliminating strains, thus the above glass of this embodiment can be obtained.

The time for clarification may be set to for example, 1 h to 3 h in terms of preventing an excessive amount of water from being lost.

(Optical Element)

An optical element of this embodiment (hereinafter may also be referred to as "the optical element of this embodiment") uses the multicomponent oxide glass described above as a material. In other words, the optical element of this embodiment includes the above-described multicomponent oxide glass. Since the optical element of this embodiment uses the multicomponent oxide glass described above as a material, it is highly resistant to ultraviolet light including UVA.

(Optical Fiber)

An optical fiber of this embodiment (hereinafter may also be referred to as "the optical fiber of this embodiment") uses the multicomponent oxide glass described above as a material. In other words, the optical fiber of this embodiment includes the above-described multicomponent oxide glass. Since the optical fiber of this embodiment uses the multicomponent oxide glass described above as a material, it is highly resistant to ultraviolet light including UVA.

EXAMPLES

Multicomponent oxide glasses of the present disclosure will be described in more concrete terms using Examples and Comparative Examples below; however, the present disclosure is not limited to Examples below.

Glasses according to Examples and Comparative Examples were produced by the following methods.

Examples 1 to 13

As the raw material for each component of each glass; an oxide, a hydroxide, or a carbonate corresponding to the component was prepared to have a weight such that the composition after vitrification would be as given in Table 1, and the materials were mixed to obtain a preparation raw material. The preparation raw material was charged into a platinum crucible, melted by heating to a temperature within 1300° C. to 1350° C. as given in Table 1, and stirred with a platinum stirring rod at the appropriate times, thereby performing homogenization. Next, after a clarification for 2.5 h, the preparation raw material was cast into a metal mold having been preheated to an appropriate temperature and were allowed to cool slowly, thus each glass was obtained.

As a result, the glasses of all Examples were found to be clear and colorless and to have no crystals precipitated and no large bubbles formed.

Comparative Examples 1 to 12

As the raw material for each component of each glass; an oxide, a hydroxide, or a carbonate corresponding to the component was prepared to have a weight such that the composition after vitrification would be as given in Table 2, and the materials were mixed to obtain a preparation raw material. The preparation raw material was charged into a platinum crucible, melted by heating to a temperature within 1300° C. to 1400° C. as given in Table 2, and stirred with a platinum stirring rod at the appropriate times, thereby performing homogenization. Next, after a clarification for 2.5 h, the preparation raw material was cast into a metal mold having been preheated to an appropriate temperature and were allowed to cool slowly, thus each glass was obtained. Note that in Comparative Examples 6, 7, 9, and 11, a homogeneous and transparent glass melt was obtained. On the other hand, in Comparative Examples 1, 4, 5, 10, and 12, unmelted residues were formed and the unmelted residues were not removed even by extending the clarification time to 4 h. Further, in Comparative Examples 3 and 8, bubbles were formed, and the bubbles were not removed even by extending the clarification time to 4 h. Moreover, in Comparative Example 2, phase separation occurred in the slow cooling, and the glass had a milky white color. Thus, it was determined that in the examples other than Comparative Examples 6, 7, 9, and 11, sufficient quality was not obtained, and subsequent evaluations were not performed for those examples.

For the glasses obtained in Examples 1 to 13 and Comparative Examples 6, 7, 9, and 11, the following evaluations were performed.

<Calculation of βOH>

Each glass worked to have a thickness of 3 mm was subjected to the measurement of the infrared absorption spectrum using "FT/IR-6100" manufactured by JASCO Corporation. βOH was calculated from the above formula (3): $\beta OH = \alpha/t$ (t=0.3 (cm)) using the height of the absorption peak due to OH groups, observed around a wave number of 3500 $cm^{-1}$ in the infrared absorption spectrum obtained. The results are given in Tables 1 and 2. For reference, FIG. 1 gives the infrared absorption spectrum data around a wave number of 3500 $cm^{-1}$ for the glass of Example 9.

<Evaluation of Degree of Solarization>

For each glass, the ultraviolet resistance was evaluated in accordance with JOGIS J04-2005 "Measuring Method for Solarization of Optical Glass". Specifically, first, the transmittance of each glass was measured using a spectrophotometer ("U-4100" manufactured by Hitachi High-Tech Science Corporation), and the wavelength of light to which the glass has a transmittance of 80% (given in Tables 1 and 2) was determined. After that, with the temperature of the glass being maintained at 100° C., an exposure test was performed in which exposure with ultraviolet light from a predetermined distance was performed using a high-pressure mercury vapor lamp for 4 h. Subsequently, the transmittance after the exposure test to light with the wavelength of light to which the glass had a transmittance of 80% before the exposure test was measured, and the change (%) in the transmittance before to after the exposure test (degree of solarization) was calculated. The results are given in Tables 1 and 2. A smaller reduction in the transmittance indicates better ultraviolet resistance (less solarization).

TABLE 1

|  |  |  | Example 1 | Example 2 | Example 3 | Example 4 | Example 5 | Example 6 | Example 7 |
|---|---|---|---|---|---|---|---|---|---|
| SiO2 |  | mol % | 51.61 | 46.52 | 45.01 | 52.42 | 51.60 | 50.27 | 49.44 |
| B2O3 |  |  | 24.60 | 26.32 | 29.95 | 20.00 | 23.59 | 23.96 | 23.56 |
| Al2O3 |  |  | 6.30 | 6.07 | 5.05 | 6.05 | 7.32 | 6.15 | 6.05 |
| Y | MgO |  | 6.40 | 6.15 | 6.12 | 6.12 | 6.40 | 0.00 | 6.13 |
|  | CaO |  | 0.00 | 0.00 | 0.00 | 0.00 | 0.00 | 4.48 | 0.00 |
|  | BaO |  | 0.00 | 0.00 | 0.00 | 0.00 | 0.00 | 0.00 | 0.00 |
|  | ZnO |  | 0.00 | 0.00 | 0.00 | 0.00 | 0.00 | 0.00 | 0.00 |
| X | Na2O |  | 8.32 | 3.99 | 3.97 | 3.97 | 11.00 | 4.04 | 3.97 |
|  | K2O |  | 2.68 | 2.57 | 2.56 | 3.10 | 0.00 | 2.61 | 2.56 |
|  | Li2O |  | 0.00 | 8.29 | 7.26 | 8.26 | 0.00 | 8.40 | 8.26 |
| Sb2O3 |  |  | 0.09 | 0.09 | 0.08 | 0.08 | 0.09 | 0.09 | 0.03 |
| Total |  |  | 100.00 | 100.00 | 100.00 | 100.00 | 100.00 | 100.00 | 100.00 |
| X |  |  | 11.00 | 14.85 | 13.79 | 15.33 | 11.00 | 15.05 | 14.79 |
| X + Y |  |  | 17.40 | 21.00 | 19.91 | 21.45 | 17.40 | 19.53 | 20.92 |
| SiO2 |  | mass % | 47.65 | 44.67 | 43.07 | 50.68 | 48.03 | 47.64 | 47.78 |
| B2O3 |  |  | 26.32 | 29.28 | 33.21 | 22.41 | 25.44 | 26.31 | 26.38 |
| Al2O3 |  |  | 9.87 | 9.89 | 8.20 | 9.93 | 11.56 | 9.89 | 9.92 |
| Y | MgO |  | 3.96 | 3.96 | 3.93 | 3.97 | 4.00 | 0.00 | 3.97 |
|  | CaO |  | 0.00 | 0.00 | 0.00 | 0.00 | 0.00 | 3.96 | 0.00 |
|  | BaO |  | 0.00 | 0.00 | 0.00 | 0.00 | 0.00 | 0.00 | 0.00 |
|  | ZnO |  | 0.00 | 0.00 | 0.00 | 0.00 | 0.00 | 0.00 | 0.00 |
| X | Na2O |  | 7.92 | 3.95 | 3.92 | 3.96 | 10.56 | 3.95 | 3.96 |
|  | K2O |  | 3.88 | 3.87 | 3.84 | 4.70 | 0.00 | 3.88 | 3.88 |
|  | Li2O |  | 0.00 | 3.96 | 3.46 | 3.97 | 0.00 | 3.96 | 3.97 |
| Sb2O3 |  |  | 0.40 | 0.42 | 0.37 | 0.38 | 0.41 | 0.41 | 0.14 |
| Total |  |  | 100.00 | 100.00 | 100.00 | 100.00 | 100.00 | 100.00 | 100.00 |
| Heating temperature |  | ° C. | 1330 | 1300 | 1300 | 1300 | 1350 | 1300 | 1300 |
| βOH |  | $cm^{-1}$ | 7.63 | 5.30 | 4.77 | 5.73 | 6.65 | 4.00 | 5.39 |
| Wavelength of 80% transmittance |  | nm | 344 | 345 | 348 | 344 | 344 | 338 | 340 |
| Change in transmittance |  | % | −0.92 | −0.5 | −0.51 | −0.98 | −0.34 | −0.89 | −0.93 |

TABLE 1-continued

|  |  |  | Example 8 | Example 9 | Example 10 | Example 11 | Example 12 | Example 13 |
|---|---|---|---|---|---|---|---|---|
| SiO2 |  | mol % | 51.61 | 48.60 | 48.60 | 48.60 | 48.60 | 51.20 |
| B2O3 |  |  | 24.59 | 27.50 | 27.50 | 27.50 | 27.50 | 24.39 |
| Al2O3 |  |  | 6.32 | 6.35 | 6.35 | 6.35 | 6.35 | 6.27 |
| Y | MgO |  | 6.40 | 0.00 | 0.00 | 0.00 | 3.42 | 6.35 |
|  | CaO |  | 0.00 | 6.42 | 0.00 | 0.00 | 0.00 | 0.00 |
|  | BaO |  | 0.00 | 0.00 | 6.42 | 0.00 | 0.00 | 0.00 |
|  | ZnO |  | 0.00 | 0.00 | 0.00 | 6.42 | 3.00 | 0.00 |
| X | Na2O |  | 11.00 | 8.35 | 8.35 | 8.35 | 8.35 | 2.05 |
|  | K2O |  | 0.00 | 2.69 | 2.69 | 2.69 | 2.69 | 5.38 |
|  | Li2O |  | 0.00 | 0.00 | 0.00 | 0.00 | 0.00 | 4.27 |
| Sb2O3 |  |  | 0.08 | 0.09 | 0.09 | 0.09 | 0.09 | 0.09 |
| Total |  |  | 100.00 | 100.00 | 100.00 | 100.00 | 100.00 | 100.00 |
| X |  |  | 11.00 | 11.04 | 11.04 | 11.04 | 11.04 | 11.70 |
| X + Y |  |  | 17.40 | 17.46 | 17.46 | 17.46 | 17.46 | 18.05 |
| SiO2 |  | mass % | 48.30 | 43.98 | 40.21 | 42.92 | 43.84 | 47.63 |
| B2O3 |  |  | 26.66 | 28.84 | 26.36 | 28.15 | 28.74 | 26.30 |
| Al2O3 |  |  | 10.04 | 9.75 | 8.91 | 9.52 | 9.72 | 9.90 |
| Y | MgO |  | 4.02 | 0.00 | 0.00 | 0.00 | 2.07 | 3.96 |
|  | CaO |  | 0.00 | 5.42 | 0.00 | 0.00 | 0.00 | 0.00 |
|  | BaO |  | 0.00 | 0.00 | 13.55 | 0.00 | 0.00 | 0.00 |
|  | ZnO |  | 0.00 | 0.00 | 0.00 | 7.68 | 3.67 | 0.00 |
| X | Na2O |  | 10.62 | 7.79 | 7.12 | 7.61 | 7.77 | 1.97 |
|  | K2O |  | 0.00 | 3.82 | 3.49 | 3.73 | 3.80 | 7.85 |
|  | Li2O |  | 0.00 | 0.00 | 0.00 | 0.00 | 0.00 | 1.98 |
| Sb2O3 |  |  | 0.36 | 0.40 | 0.36 | 0.39 | 0.39 | 0.41 |
| Total |  |  | 100.00 | 100.00 | 100.00 | 100.00 | 100.00 | 100.00 |
| Heating temperature |  | ° C. | 1330 | 1300 | 1300 | 1300 | 1300 | 1330 |
| βOH |  | cm$^{-1}$ | 5.49 | 7.23 | 6.59 | 8.72 | 7.73 | 5.91 |
| Wavelength of 80% transmittance |  | nm | 347 | 344 | 337 | 344 | 342 | 344 |
| Change in transmittance |  | % | −0.69 | −0.51 | −0.94 | −0.27 | −0.23 | −0.4 |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| SiO2 |  | mol % | 55.01 | 43.00 | 45.01 | 52.42 | 46.00 | 51.42 |
| B2O3 |  |  | 22.00 | 27.00 | 33.00 | 16.00 | 24.00 | 25.54 |
| Al2O3 |  |  | 5.00 | 6.05 | 5.05 | 8.05 | 10.01 | 2.05 |
| Y | MgO |  | 6.12 | 7.08 | 4.12 | 6.12 | 6.12 | 6.12 |
|  | CaO |  | 0.00 | 0.00 | 0.00 | 2.00 | 0.00 | 0.00 |
|  | BaO |  | 0.00 | 0.00 | 0.00 | 0.00 | 0.00 | 0.00 |
|  | ZnO |  | 0.00 | 0.00 | 0.00 | 0.00 | 0.00 | 0.00 |
| X | Na2O |  | 3.97 | 5.97 | 3.97 | 3.97 | 3.97 | 3.97 |
|  | K2O |  | 2.56 | 2.56 | 2.56 | 3.10 | 2.56 | 2.56 |
|  | Li2O |  | 5.26 | 8.26 | 6.21 | 8.26 | 7.26 | 8.26 |
| Sb2O3 |  |  | 0.08 | 0.08 | 0.08 | 0.08 | 0.08 | 0.08 |
| Total |  |  | 100.00 | 100.00 | 100.00 | 100.00 | 100.00 | 100.00 |
| X |  |  | 11.79 | 16.79 | 12.74 | 15.33 | 13.79 | 14.79 |
| X + Y |  |  | 17.91 | 23.87 | 16.86 | 23.45 | 19.91 | 20.91 |
| SiO2 |  | mass % | 52.80 | 41.36 | 42.39 | 50.38 | 42.99 | 50.81 |
| B2O3 |  |  | 24.46 | 30.09 | 36.02 | 17.82 | 25.99 | 29.24 |
| Al2O3 |  |  | 8.14 | 9.88 | 8.07 | 13.13 | 15.87 | 3.44 |
| Y | MgO |  | 3.94 | 4.57 | 2.60 | 3.95 | 3.84 | 4.06 |
|  | CaO |  | 0.00 | 0.00 | 0.00 | 1.79 | 0.00 | 0.00 |
|  | BaO |  | 0.00 | 0.00 | 0.00 | 0.00 | 0.00 | 0.00 |
|  | ZnO |  | 0.00 | 0.00 | 0.00 | 0.00 | 0.00 | 0.00 |
| X | Na2O |  | 3.93 | 5.92 | 3.86 | 3.94 | 3.83 | 4.05 |
|  | K2O |  | 3.85 | 3.86 | 3.78 | 4.67 | 3.75 | 3.96 |
|  | Li2O |  | 2.51 | 3.95 | 2.91 | 3.95 | 3.37 | 4.06 |
| Sb2O3 |  |  | 0.37 | 0.37 | 0.37 | 0.37 | 0.36 | 0.38 |
| Total |  |  | 100.00 | 100.00 | 100.00 | 100.00 | 100.00 | 100.00 |
| Heating temperature |  | ° C. | 1400 | 1300 | 1300 | 1400 | 1400 | 1300 |
| βOH |  | cm$^{-1}$ | — | — | — | — | — | 3.12 |
| Wavelength of 80% transmittance |  | nm |  |  |  |  |  | 339 |
| Change in transmittance |  | % |  |  |  |  |  | −1.13 |
| Notes |  |  | Unmelted residue | Phase separation | Bubbles | Unmelted residue | Unmelted residue | — |

TABLE 2-continued

|  |  |  | Comparative Example 7 | Comparative Example 8 | Comparative Example 9 | Comparative Example 10 | Comparative Example 11 | Comparative Example 12 |
|---|---|---|---|---|---|---|---|---|
| $SiO_2$ |  | mol % | 48.56 | 48.65 | 47.64 | 52.89 | 46.01 | 52.89 |
| $B_2O_3$ |  |  | 27.50 | 27.52 | 22.70 | 23.50 | 23.54 | 26.50 |
| $Al_2O_3$ |  |  | 6.35 | 6.35 | 5.83 | 7.00 | 5.50 | 7.00 |
| Y | MgO |  | 6.42 | 6.42 | 4.44 | 6.00 | 6.12 | 1.00 |
|  | CaO |  | 0.00 | 0.00 | 0.00 | 0.00 | 3.96 | 0.00 |
|  | BaO |  | 0.00 | 0.00 | 0.00 | 0.00 | 0.00 | 0.00 |
|  | ZnO |  | 0.00 | 0.00 | 0.00 | 0.00 | 0.00 | 0.00 |
| X | $Na_2O$ |  | 8.35 | 8.36 | 2.16 | 3.97 | 3.97 | 3.97 |
|  | $K_2O$ |  | 2.69 | 2.69 | 1.20 | 2.56 | 2.56 | 2.56 |
|  | $Li_2O$ |  | 0.00 | 0.00 | 15.95 | 4.00 | 8.26 | 6.00 |
| $Sb_2O_3$ |  |  | 0.13 | 0.01 | 0.08 | 0.08 | 0.08 | 0.08 |
| Total |  |  | 100.00 | 100.00 | 100.00 | 100.00 | 100.00 | 100.00 |
| X |  |  | 11.04 | 11.05 | 19.31 | 10.53 | 14.79 | 12.53 |
| X + Y |  |  | 17.46 | 17.47 | 23.75 | 16.53 | 24.87 | 13.53 |
| $SiO_2$ |  | mass % | 44.56 | 44.83 | 48.00 | 49.66 | 44.66 | 49.14 |
| $B_2O_3$ |  |  | 29.24 | 29.39 | 26.50 | 25.57 | 26.47 | 28.53 |
| $Al_2O_3$ |  |  | 9.89 | 9.93 | 9.97 | 11.15 | 9.06 | 11.04 |
| Y | MgO |  | 3.95 | 3.97 | 3.00 | 3.78 | 3.98 | 0.62 |
|  | CaO |  | 0.00 | 0.00 | 0.00 | 0.00 | 3.59 | 0.00 |
|  | BaO |  | 0.00 | 0.00 | 0.00 | 0.00 | 0.00 | 0.00 |
|  | ZnO |  | 0.00 | 0.00 | 0.00 | 0.00 | 0.00 | 0.00 |
| X | $Na_2O$ |  | 7.91 | 7.95 | 2.25 | 3.84 | 3.97 | 3.80 |
|  | $K_2O$ |  | 3.87 | 3.89 | 1.90 | 3.77 | 3.90 | 3.73 |
|  | $Li_2O$ |  | 0.00 | 0.00 | 7.99 | 1.87 | 3.99 | 2.78 |
| $Sb_2O_3$ |  |  | 0.58 | 0.04 | 0.39 | 0.36 | 0.38 | 0.36 |
| Total |  |  | 100.00 | 100.00 | 100.00 | 100.00 | 100.00 | 100.00 |
| Heating temperature |  | ° C. | 1300 | 1300 | 1300 | 1400 | 1300 | 1400 |
| βOH |  | $cm^{-1}$ | 6.98 | — | 2.97 | — | 3.39 | — |
| Wavelength of 80% transmittance |  | nm | 352 |  | 345 |  | 350 |  |
| Change in transmittance |  | % | −1.07 |  | −1.33 |  | −1.45 |  |
| Notes |  |  | — | Bubbles | — | Unmelted residue | — | Unmelted residue |

Table 1 demonstrated that for the glasses of all Examples, βOH was 4 $cm^{-1}$ or more, and the change in the transmittance in the exposure test was a reduction of 1% or less, thus no practical problems would arise in terms of solarization. Note that the quantity of OH groups in the glass of Example 1 (density: 2.34 $g/cm^3$) was calculated using the above formula (A) where the molar absorption coefficient (ε) of the OH groups was 55 L/mol·cm and was 1008 ppm by mass. Further, for all the glasses of Examples other Example 1, the quantity of OH groups was calculated to be more than 500 ppm by mass.

By contrast, for the glasses of Comparative Example 6, 9, and 11, βOH was less than 4 $cm^{-1}$. In a similar manner to the above, for the glasses of Comparative Example 6, 9, and 11, the quantity of the OH groups was calculated to be less than 500 ppm by mass. Further, for the glasses of Comparative Examples 6, 9, and 11, the transmittance was reduced by more than 1% in the exposure test, thus practical problems would arise.

Further, for the glass of Comparative Example 7, although βOH was 4 $cm^{-1}$ or more, the transmittance was reduced by more than 1% in the exposure test, thus practical problems would arise. This may be attributed to that the glass contained an excessive amount of $Sb_2O_3$.

Comparative Example 13: Changing Raw Materials in Glass of Example 11

A glass was obtained in the same manner as in Example 11, except that a nitrate, specifically potassium nitrate was used as at least part of the raw materials for glass for adding a potassium component to the glass under the conditions for producing the glass of Example 11. The glass obtained was subjected to the same evaluations as the above. The results are given with the results of Example 11 in Table 3.

TABLE 3

|  |  |  | Example 11 | Comparative Example 13 |
|---|---|---|---|---|
| $SiO_2$ |  | mol % | 48.60 | 48.60 |
| $B_2O_3$ |  |  | 27.50 | 27.50 |
| $Al_2O_3$ |  |  | 6.35 | 6.35 |
| Y | MgO |  | 0.00 | 0.00 |
|  | CaO |  | 0.00 | 0.00 |
|  | BaO |  | 0.00 | 0.00 |
|  | ZnO |  | 6.42 | 6.42 |
| X | $Na_2O$ |  | 8.35 | 8.35 |
|  | $K_2O$ |  | 2.69 | 2.69 |
|  | $Li_2O$ |  | 0.00 | 0.00 |
| $Sb_2O_3$ |  |  | 0.09 | 0.09 |
| Total |  |  | 100.00 | 100.00 |
| X |  |  | 11.04 | 11.04 |
| X + Y |  |  | 17.46 | 17.46 |
| $SiO_2$ |  | mass % | 42.92 | 42.92 |
| $B_2O_3$ |  |  | 28.15 | 28.15 |
| $Al_2O_3$ |  |  | 9.52 | 9.52 |
| Y | MgO |  | 0.00 | 0.00 |
|  | CaO |  | 0.00 | 0.00 |
|  | BaO |  | 0.00 | 0.00 |
|  | ZnO |  | 7.68 | 7.68 |
| X | $Na_2O$ |  | 7.61 | 7.61 |
|  | $K_2O$ |  | 3.73 | 3.73 |
|  | $Li_2O$ |  | 0.00 | 0.00 |
| $Sb_2O_3$ |  |  | 0.39 | 0.39 |
| Total |  |  | 100.00 | 100.00 |
| Heating temperature |  | ° C. | 1300 | 1300 |
| βOH |  | $cm^{-1}$ | 8.72 | 3.59 |

TABLE 3-continued

|  |  | Example 11 | Comparative Example 13 |
|---|---|---|---|
| Wavelength of 80% transmittance | nm | 344 | 346 |
| Change in transmittance | % | −0.27 | −1.03 |

Table 3 demonstrates that βOH of the glass of Comparative Example 13 was lower than βOH of the glass of Example 11 and was less than 4 cm$^{-1}$. This suggests that when a glass is produced using nitrates or sulfates as raw materials for glass, sufficient amount of water would not be incorporated.

Comparative Example 14: Changing Heating Temperature in Melting

A glass was obtained in the same manner as in Example 11, except that the heating temperature in melting was changed from 1300° C. to 1400° C. under the conditions for producing the glass of Example 11. The glass obtained was subjected to the same evaluations as the above. The results are given with the results of Example 11 in Table 4.

TABLE 4

|  |  |  | Example 11 | Comparative Example 14 |
|---|---|---|---|---|
| SiO2 |  | mol % | 48.60 | 48.60 |
| B2O3 |  |  | 27.50 | 27.50 |
| Al2O3 |  |  | 6.35 | 6.35 |
| Y | MgO |  | 0.00 | 0.00 |
|  | CaO |  | 0.00 | 0.00 |
|  | BaO |  | 0.00 | 0.00 |
|  | ZnO |  | 6.42 | 6.42 |
| X | Na2O |  | 8.35 | 8.35 |
|  | K2O |  | 2.69 | 2.69 |
|  | Li2O |  | 0.00 | 0.00 |
| Sb2O3 |  |  | 0.09 | 0.09 |
| Total |  |  | 100.00 | 100.00 |
| X |  |  | 11.04 | 11.04 |
| X + Y |  |  | 17.46 | 17.46 |
| SiO2 |  | mass % | 42.92 | 42.92 |
| B2O3 |  |  | 28.15 | 28.15 |
| Al2O3 |  |  | 9.52 | 9.52 |
| Y | MgO |  | 0.00 | 0.00 |
|  | CaO |  | 0.00 | 0.00 |
|  | BaO |  | 0.00 | 0.00 |
|  | ZnO |  | 7.68 | 7.68 |
| X | Na2O |  | 7.61 | 7.61 |
|  | K2O |  | 3.73 | 3.73 |
|  | Li2O |  | 0.00 | 0.00 |
| Sb2O3 |  |  | 0.39 | 0.39 |
| Total |  |  | 100.00 | 100.00 |
| Heating temperature |  | ° C. | 1300 | 1400 |
| βOH |  | cm$^{-1}$ | 8.72 | 3.29 |
| Wavelength of 80% transmittance |  | nm | 344 | 352 |
| Change in transmittance |  | % | −0.27 | −1.64 |

Table 4 demonstrates that βOH of the glass of Comparative Example 14 was lower than βOH of the glass of Example 11 and was less than 4 cm$^{-1}$. This suggests that when a glass is produced through melting of the raw materials for glass at heating temperatures of 1350° C. or more, sufficient amount of water would not be incorporated.

INDUSTRIAL APPLICABILITY

The present disclosure provides a glass having excellent solarization resistance that can be stably produced without the need for special work. The present disclosure also provides an optical element and an optical fiber using the glass described above. Further, the present disclosure provides a method of producing glass, which makes it possible to stably produce a glass having excellent solarization resistance without the need for special work.

The invention claimed is:

1. A multicomponent oxide glass having a composition comprising:
    45 mol % to 53 mol % SiO$_2$;
    22 mol % to 30 mol % B$_2$O$_3$;
    5 mol % to 9 mol % Al$_2$O$_3$;
    0.03 mol % to 0.10 mol % Sb$_2$O$_3$;
    0 mol % to 18 mol % Li$_2$O;
    0 mol % to 18 mol % Na$_2$O;
    0 mol % to 18 mol % K$_2$O;
    0 mol % to 13 mol % MgO;
    0 mol % to 13 mol % CaO;
    0 mol % to 13 mol % BaO; and
    0 mol % to 13 mol % ZnO,
    wherein when a total content of Li$_2$O, Na$_2$O, and K$_2$O is X mol % and a total content of MgO, CaO, BaO, and ZnO is Y mol %, formulae (1) and (2):

$$11 \leq X \leq 18 \quad (1) \text{ and}$$

$$14 \leq X+Y \leq 24 \quad (2)$$

hold, and
    a value of βOH calculated from formula (3):

$$\beta OH = \alpha/t \quad (3),$$

where α represents a height of an absorption peak due to OH groups, observed in a range of 3400 cm$^{-1}$ to 3800 cm$^{-1}$ of an infrared absorption spectrum in no unit and t represents a thickness of the glass in cm,
    is 4 cm$^{-1}$ or more.

2. An optical element using the multicomponent oxide glass according to claim 1.

3. An optical fiber using the multicomponent oxide glass according to claim 1.

4. A method of producing the multicomponent oxide glass according to claim 1, comprising a step of melting raw materials for glass,
    wherein the raw materials for glass do not use a nitrate and a sulfate, and
    a heating temperature in melting the raw materials for glass is 1350° C. or less.

* * * * *